US007236466B1

(12) United States Patent
Benz et al.

(10) Patent No.: US 7,236,466 B1
(45) Date of Patent: Jun. 26, 2007

(54) PULSING THE TRANSMIT MODE FOR REDUCING THE POWER WHEN REDUNDANCY IS INVOLVED IN TRANSMISSION

(75) Inventors: Michael Benz, Feldkirchen (DE);
Juergen Michel, Munich (DE);
Bernhard Raaf, Munich (DE);
Hartmut Wilhelm, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/959,774

(22) PCT Filed: Apr. 4, 2000

(86) PCT No.: PCT/DE00/01037

§ 371 (c)(1),
(2), (4) Date: Jan. 28, 2002

(87) PCT Pub. No.: WO00/69091

PCT Pub. Date: Nov. 6, 2000

(30) Foreign Application Priority Data

May 7, 1999 (DE) ................................ 199 21 111

(51) Int. Cl.
*H04B 7/185* (2006.01)
*H04B 7/00* (2006.01)
*H04L 1/00* (2006.01)
(52) U.S. Cl. .................... 370/318; 370/335; 375/346
(58) Field of Classification Search ........ 370/310–345; 455/7, 436–444, 450–456
See application file for complete search history.

(56) References Cited

U.S. PATENT DOCUMENTS 3,534,264 A * 10/1970 Blasbalg et al. ............ 375/285

(Continued)

FOREIGN PATENT DOCUMENTS

EP          0 848 515 A2      6/1998

(Continued)

OTHER PUBLICATIONS

"Forward and Reverse Link Capacity Enhancement of DS/CDMA Cellular System using Channel Activation and Soft Power Control Techniques" by Masayuki Hashimoto, et al., Graduate School of Engineering, Osaka University, (XP-002146787).

(Continued)

*Primary Examiner*—Wing Chan
*Assistant Examiner*—Venkatesh Haliyur
(74) *Attorney, Agent, or Firm*—Morrison & Foerster LLP

(57) ABSTRACT

The invention relates to a method for power reduction and to a communications system, in particular a radio communications system, which allows such a method. The method for data transmission in a radio communications system having a radio interface between at least one, and in particular a large number of, base stations and at least one, and in particular a large number of, subscriber stations, in which one base station can in each case be connected via a radio interface to a number of subscriber stations provides redundantly coded data which, for the connection with at least one first transmission power level, is transmitted such that data loss is accepted. A chosen portion of the coded data is omitted during the transmission, and the transmission power level is, in contrast, chosen to be higher than the first transmission power level, such that the bit error probability is sufficiently low to allow the data to be reconstructed at the receiving station.

21 Claims, 3 Drawing Sheets

U.S. PATENT DOCUMENTS

| | | | | |
|---|---|---|---|---|
| 4,357,700 A | * | 11/1982 | Alvarez et al. | 370/317 |
| 5,537,410 A | * | 7/1996 | Li | 370/465 |
| 5,602,836 A | * | 2/1997 | Papadopoulos et al. | 370/280 |
| 5,768,254 A | * | 6/1998 | Papadopoulos et al. | 370/201 |
| 6,031,827 A | * | 2/2000 | Rikkinen et al. | 370/330 |
| 6,262,994 B1 | | 7/2001 | Dirschedl et al. | |
| 6,456,605 B1 | * | 9/2002 | Laakso et al. | 370/330 |
| 6,567,459 B1 | * | 5/2003 | Hakkinen et al. | 375/132 |

FOREIGN PATENT DOCUMENTS

| | | |
|---|---|---|
| WO | WO-00/64070 A2 | 10/2000 |

OTHER PUBLICATIONS

"Adaptive Frame Length Control for Improving Wireless Link Throughput, Range, and Energy Efficiency" by Paul Lettieri, et al., Electrical Engineering Department, University of California, (XP-000852037).

"Variable Packet Aloha Networks" by Joseph T. McCartin, et al., Department of Electrical and Computer Engineering, Naval Postgraduate School California, (XP-000204140).

ETSI SMG2 Layer 1 Expert Group Meeting Summary; Oslo, Norway; Apr. 1-2, 1998.

ETSI SMG2 UMTS L1 Expert Group Meeting Summary; Helsinki, Finland; Sep. 8-11, 1998.

* cited by examiner (Prior Art)

PULSING THE TRANSMIT MODE FOR REDUCING THE POWER WHEN REDUNDANCY IS INVOLVED IN TRANSMISSION

CLAIM FOR PRIORITY

This application claims priority to International Application No. PCT/DE00/01037 which was published in the German language on Nov. 16, 2000.

TECHNICAL FIELD OF THE INVENTION

The invention relates to a method for power reduction during data transmission with redundancy, and to a communications system, in particular a radio communications system, which allows such a method.

BACKGROUND OF THE INVENTION

In radio communications systems, information (for example voice, image information or other data) is transmitted by electromagnetic waves via a radio interface between a transmitting and a receiving station (base station and subscriber station, respectively). The electromagnetic waves are in this case transmitted at carrier frequencies which are in the frequency band intended for the respective system. Frequencies in the frequency band around 2000 MHz have been provided for future mobile radio systems using CMDA or TD/CDMA transmission methods via the radio interface, for example the UMTS (Universal Mobile Telecommunication System) or other $3^{rd}$ generation systems.

Transmission circuits in radio communications systems generally have a limited dynamic range in which they operate or work efficiently with regard to the power. For a number of applications, in particular in mobile radio, the distance between the transmitter and the receiver often fluctuate to a major extent during operation. It therefore becomes desirable to adapt the transmission power level over a range of up to several orders of magnitude in order to keep the ratio of the energy per bit to the noise power density (Eb/No) or the ratio of the signal to interferer or carrier power to interference power (C/I) within the limit range or desired range. Firstly, the received power must have a minimum level which is required for the desired Quality of Service (QoS), but, secondly, as little interference as possible should be produced.

Apart from the distance, the data rate may also be variable. For a constant Eb/No the mean transmission power level must therefore be adapted not only in response to any change in the path loss, but also in response to any change in the data rate.

In systems which use a spread band technique, the spread factor also varies with the data rate. The lower the data rate, the higher the process gain and the lower the mean transmission power level must be for a constant Eb. Low data rates occur, for example, during voice transmission, when only a silent description is transmitted during pauses in speech.

The power consumption of a transmission circuit is in this case generally not proportional to the transmission power level. The lower the transmission power level is chosen to be, the poorer is the efficiency. Particularly in mobile radio systems, this represents a problem since, firstly, there is an aim to reduce the transmission power level of mobile transmission and receiving stations (MS) to an even greater extent, which leads to the equipment having a relatively high power consumption. Secondly, these mobile stations are intended to be ever smaller, lighter and more convenient. As the sizes reduce, less and less space is available for batteries or rechargeable batteries. That is, the capacity is comparatively low. Both factors lead to a reduction in the standby time and transmission time. Although the rechargeable batteries have also been developed further in parallel with the reduction in size of the mobile stations, the gain in capacity is comparatively low in relation to the reductions in capacity mentioned above.

Various approaches are known for solving the problem mentioned above.

When using the spread band technique, a low power level is normally used for transmission, with a low path loss and a low data rate (that is to say a high spread factor). However, reducing the transmitter power results in the transmission circuit having poor efficiency.

In the multislot technique, the data rate is increased or decreased by making use of a greater or lesser number of timeslots. The duty cycle of the transmitter is reduced when the data rate is reduced, and hence the mean transmission power level. However, this does not reduce the efficiency, or reduces it to a lesser extent than when transmitting with the same duty cycle and a lower amplitude. This technique is known from the "Enhanced Slotted DL transmission mode", ETSI SMG2 Layer 1 Expert Group Meeting, April 1998, Oslo, Norway.

In a method with power control, the transmitter is intended to be able to reduce its transmission power level to a fraction of the maximum power—for example by around 30 dB for GSM (Global System for Mobile Communication), and by around 80 dB for UMTS. One disadvantage in this case is that the power consumption of the transmission circuit is reduced to a considerably lesser extent than the power output. Particularly in battery-operated transmitters, this is unsatisfactory since the transmission time and speech time are extended to only a very limited extent by reducing the transmission power level. Such a technique is known from the "Mobile station TX power", ETSI SMG2 UMTS L1 Expert Group Meeting, September 1998, Helsinki, Finland.

In other words, power control is in this case replaced by Eb control (Eb: Energy per coded bit) with the latter being possible not just by control of the transmission power level, but also by control of the channel coding rate.

SUMMARY OF THE INVENTION

In one embodiment of the invention, there is a method for power reduction during data transmission in a communications system having an interface between at least a first station and a second station, which includes redundantly coding data to be transmitted such that the data is reconstructed in the event of data loss during transmission, the data is transmitted at least a first transmission power level, when using a first duty cycle or when using a first spread factor; and omitting a selected portion of the coded data during transmission, and in the case of a spread band system, the data is transmitted using a spread factor which is less than the first spread factor, wherein a duty cycle used for transmission of the data is lower than the first duty cycle, and the transmission power level is set to be higher than the first transmission power level, such that a bit error probability reconstructs the transmitted coded data in the first or second station receiving the data.

In one aspect of the invention, the transmission uses the FDD or TDD mode, and is pulsed, in timeslots and/or using a multislot method.

In another aspect of the invention, the transmission of the data when the capacity of a cell for the station receiving data is low or exhausted is either initiated at the first transmission power level or a connection request is rejected, and a transmission mode is initiated with one of the omission of data or the reduction in the duty cycle if the cell has free capacity above a predetermined threshold value.

In yet another aspect of the invention, information relating to the omitted data is transmitted to a channel decoder in the station receiving the data.

In still another aspect of the invention, the omitted data or the duty cycle reduction is identified by a channel decoder as transmission-dependent deletions.

In one aspect of the invention, the omitted data or the duty cycle reduction are selected by the stations transmitting and receiving data, or are pre-set.

In another aspect of the invention, transmissions with omitted data or the duty cycle reduction are initiated for stations transmitting data which are located close to the stations receiving data.

In yet another aspect of the invention, transmissions with omitted data or the duty cycle reduction are initiated in the voice mode.

In still another aspect of the invention, the duration of each omission of data is chosen to be shorter than an interleaving depth.

In one aspect of the invention, the ratio of omission to the total amount of data is less than 1 minus a code rate.

In another aspect of the invention, the data is transmitted at an increased power level using a multislot method to reduce interference when the first or second station transmitting with a higher quality signal-to-noise ratio is received.

In yet another aspect of the invention, the data for the second station which is transmitting at the lowest power level, is transmitted discontinuously.

In still another aspect of the invention, the duration of active and inactive phases are defined and/or selected dynamically between the first and second stations.

In one aspect of the invention, the inactive phases are shorter than a coherence time of a control channel.

In another aspect of the invention, transmission and quiescent phases are defined or agreed upon dynamically, with the duration of the inactive phases being short compared to the duration over which the received power is averaged when calculating the path loss.

In yet another aspect of the invention, when reception quality reduces after omission of data or the duty cycle reduction, the receiving station requests a higher transmission power level to be higher than the maximum transmission power level in an appropriate transmission standard.

In still another aspect of the invention, the transmission power level of the transmitted data is readjusted without excessive delay.

In one aspect of the invention, burst duration is reduced or not transmitted.

In another aspect of the invention, the power control is modified such that a control channel is switched on before the end of the DTX operation.

In still another aspect of the invention, alternate slots are transmitted, or a certain number of slots are omitted.

In yet another aspect of the invention, a communications system, which includes at least one first station; and at least one second station connected via an interface for data transmission; a processing device in at least one of the first and second stations for processing received, redundantly coded data or redundantly coded data to be transmitted, a portion of the data which may be lost during data transmission during at least a first transmission power level when using a first duty cycle or when using a first spread factor, wherein the processing device selects and omits a portion of the coded data or uses a spread factor for the transmission of the data, uses a duty cycle for the transmission of the data which is less than the first duty cycle, and sets the transmission power level to a higher value than the first transmission power level for the transmission of the data, so that the transmitted data can be reconstructed for an adequate Quality of Service.

BRIEF DESCRIPTION OF THE DRAWINGS

An exemplary embodiment and modifications of the invention will be explained in more detail in the following text with reference to the drawings, in which.

DETAILED DESCRIPTION OF THE PREFERRED EMBODIMENT

Figure 1:
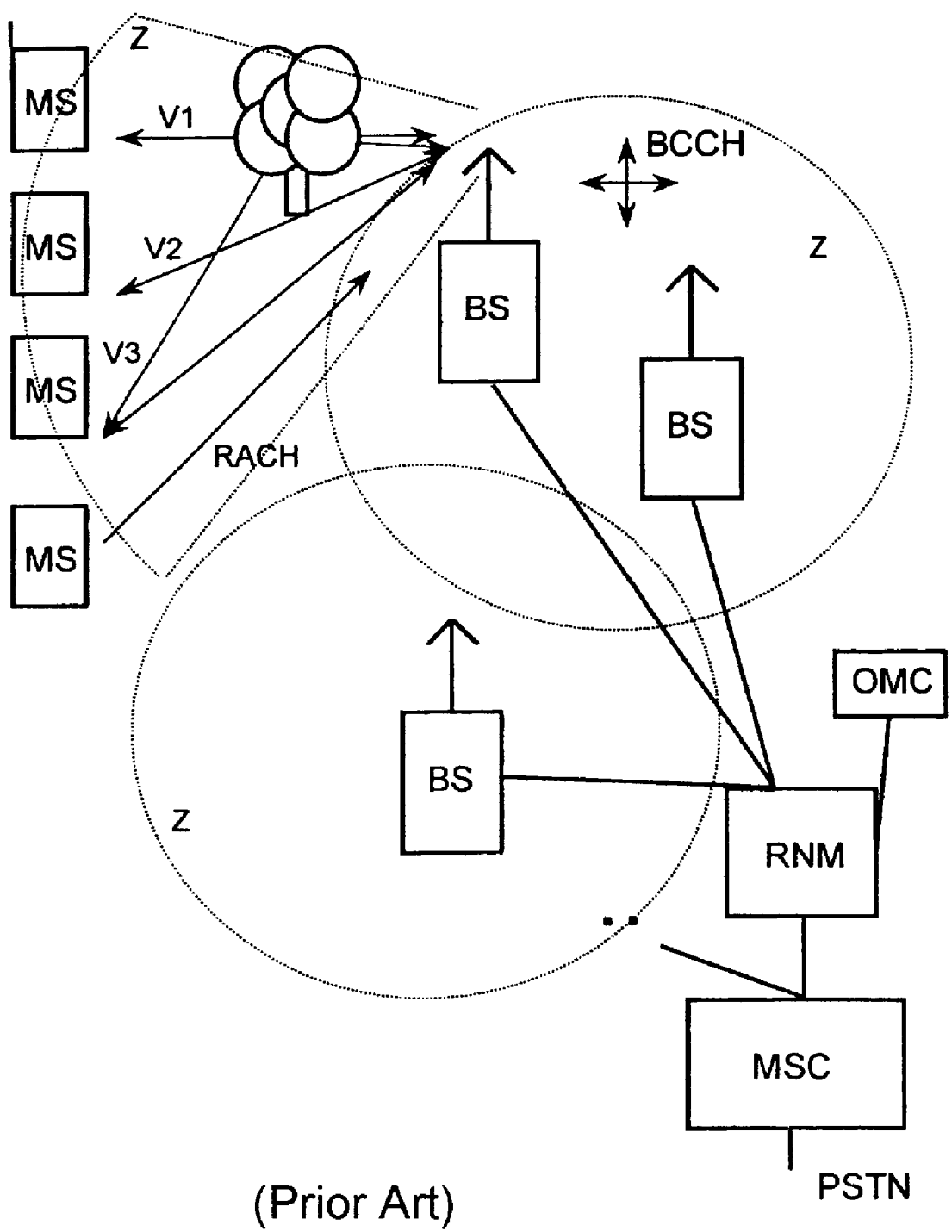
FIG. 1 shows a block diagram of a prior art mobile radio system.

The invention discloses a method for improved power reduction during redundant data transmission, and a communications system which allows such a method.

Reducing the amount of data to be transmitted, and transmitting at a comparatively high transmission power level, allows energy to be saved. Hence, the transmission of a smaller amount of data at an increased power level consumes less energy than transmission of a larger amount of data at a lower transmission power level. This allows, for example, the standby time and/or the speech time for a mobile station to be extended or, for the same time, the size of the rechargeable battery, and hence of the entire appliance, to be reduced. In this case, the amount of data can be reduced by omitting data and/or by reducing the duty cycle. It is also advantageous in this case that different requirements for reconstructability exist, depending on the required Quality of Service. These requirements are, for example, less stringent for voice transmission than for data transmission.

The proposed method is particularly advantageous for a TDD system (TTD: Time Division Duplex), and, especially in a GSM system, all talktime details are conserved by DTX, which is no longer possible with the UTRA control that is desirable in the future.

However, with UMTS, the proposed method can also be used in the FDD mode. This is already known from the uplink slotted mode (mode which is used during uplink operation—from a mobile station to a base station—in contrast to continuous operation with timeslots) for adjacent channel searches, although a handover is then typically made to a TDMA system (TDMA: Time Division Multiple Access) so that there is no advantage in transmitting in burst form shortly in advance.

Energy savings can be achieved in particular by transmitting the reduced amount of data in short timeslots, with a correspondingly short transmission duration at a higher energy level. Since this method reduces the capacity of a cell in comparison to power control, it is preferably used only when the cell is not fully loaded, or preferably for those mobile stations which are close to the base station and thus produce less interference (in particular with adjacent stations).

It is thus advantageous to determine the capacity load level of a cell, in particular for automatic switching between the known mode and the proposed mode by omitting data during transmission. It is first preferable to ensure optimum utilisation of the cell for as many mobile stations as possible with a large number of simultaneous connection requests, and second to ensure that the energy consumption is as low as possible when there are few connection requests.

The receiving station need not necessarily be informed of the reduction in the data in the transmitting station, since the received data can be dealt with in the same way as data of which a portion has been lost during the radio transmission process. Random choice of the data to be omitted offers the advantages of interference averaging, while regular selection offers better time diversity.

The deliberate use of an interleaver for additional transmission of information which indicates to the receiving station that data has been omitted or the duty cycle has been reduced simplifies the computation procedure in the channel decoder there. It is particularly useful to transmit information relating to the puncturing used with respect to the convolution code that is used.

Restricting the method to mobile stations that are close by reduces interference problems with adjacent receiving or base stations. In the case of stations which are already transmitting at the minimum permissible power level, such as stations that are close by, further data reduction can likewise lead to energy savings.

The method can be used particularly advantageously in the voice mode, especially during pauses in speech since, in this case, the requirements for the remaining bit error probability for reconstruction of an adequate amount of data are not excessively stringent.

The shorter the individual omissions in comparison to the interleaving depth and the smaller the ratio of the omissions to the total amount of data, the less the increase in the transmission power level need be for the method to be carried out in a stable manner.

There are a large number of implementation options for the omission of data, and these can be used for various transmission methods.

It is also particularly advantageous to readjust the transmission power level when the environmental conditions vary.

In addition to the radio communications field for mobile radio, this method can also be applied to other communications system types, for example optical, wave-optical, acoustic and/or cable-based systems.

The mobile radio system illustrated in FIG. 1, as an example of a known radio communications system, comprises a large number of mobile switching centers MSC, which are networked with one another and provide access to a landline network PSTN. Furthermore, these mobile switching centers MSC are each connected to at least one device RNM for allocation of radio resources. Each of these devices RNM in turn allows a connection to at least one base station BS. Such a base station BS can set up a connection to subscriber stations, for example mobile stations MS or other mobile and stationary terminals, via a radio interface. At least one radio cell Z is formed by each base station BS.

In the case of sectorization or hierarchical cell structures, a number of radio cells Z are also supplied by each base station BS.

By way of example, FIG. 1 shows existing connections V1, V2, V3 for transmission of user information and signaling information between mobile stations MS and a base station BS, and a request for resource allocation or a short acknowledgement message in an access channel RACH by a further mobile station MS. In addition, an organization channel (BCCH: Broadcast Control Channel) is shown, which is provided for transmitting user information and signaling information at a defined transmission level from each of the base stations (BS) for all the mobile stations.

An operation and maintenance center OMC provides monitoring and maintenance functions for the mobile radio system, or for parts of it. The functionality of this structure can be transferred to other radio communications systems, in particular for subscriber access networks with wire-free subscriber connection.

Figure 2:
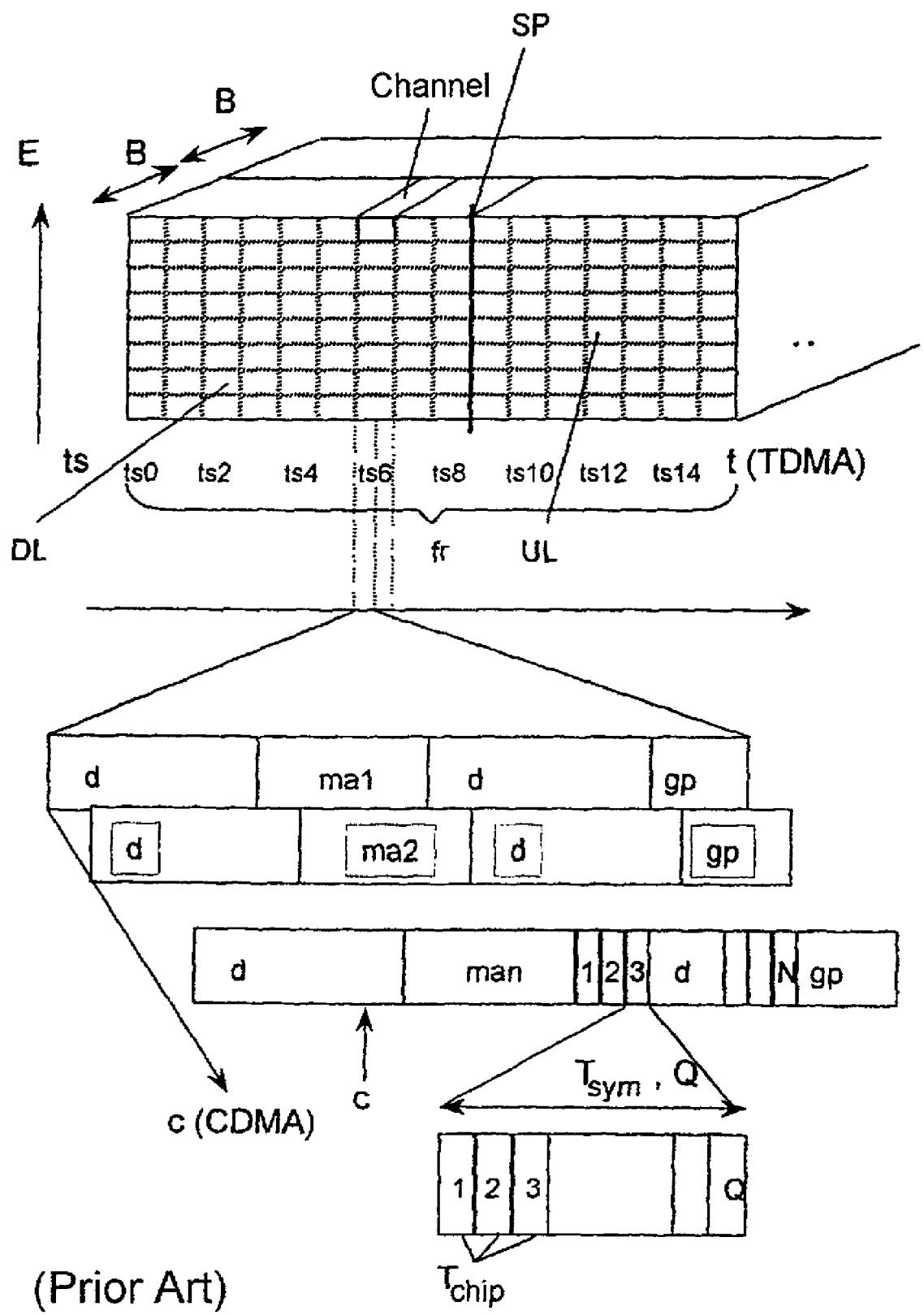
FIG. 2 shows an exemplary illustration of the frame structure for the TDD transmission method.

The radio transmission frame structure can be seen in FIG. 2. According to a TDMA component (TDMA: Time Division Multiple Access), a broadband frequency range, for example with a bandwidth of B=5 MHz, is subdivided into a number of timeslots ts of the same duration, for example 16 timeslots ts0 to ts15. A frequency band extends over a frequency range B. Some of the timeslots ts0 to ts8 are used in the downlink direction DL (Downlink from the BS to the MS), and some of the timeslots ts9 to ts15 are used in the uplink direction UL (Uplink from the MS to the BS). In between, there are one or more switching points SP—only one switching point in FIG. 2. In this TDD transmission method, the frequency band for the uplink direction UL corresponds to the frequency band for the downlink direction DL. The same situation is repeated for further carrier frequencies.

Information for a number of connections is transmitted in bursts within the timeslots ts. Bursts for user data transmission comprise sections with data d, in which training sequences ma1 to man, which are known at the receiving end, are embedded. The data d with 1 . . . N symbols is spread on a connection-specific basis using a fine structure, a subscriber code c, so that, for example, n connections can be separated at the receiving end by means of this CDMA component (CDMA: Code Division Multiple Access). A physical channel is in this case formed by a frequency band B, a timeslot, for example ts6, and a subscriber code c. A number of physical resources are generally linked to one logical channel in order to transmit services at high data rates. For example, eight physical resources are in each case required for the 144 kbit/s service in the uplink and downlink.

The spreading of individual symbols in the data d means that Q chips of duration Tchip are transmitted within the symbol duration Tsym. The Q chips in this case form the connection-specific subscriber code c. Furthermore, a guard period gp is provided within the timeslot ts, in order to compensate for the signals having different signal propagation times in the connections.

The parameters used for the UMTS/TDD radio interface are, advantageously:

| | |
|---|---|
| Chip rate: | 4096 Mcps |
| Frame duration: | 10 ms |
| Number of timeslots: | 16 |

-continued

| Duration of one timeslot: | 625 µs |
|---|---|
| Spread factor: | 16 |
| Modulation type: | QPSK |
| Bandwidth: | 5 MHz |
| Frequency repetition value: | 1 |

These parameters also allow particularly suitable harmonisation with FDD mode (FDD: Frequency Division Duplex) for the 3$^{rd}$ generation of mobile radios.

In the TDD mode, the subscriber-specific distinction is provided by an appropriately assigned spread code c. A mobile station MS which wishes to set up a connection receives, in response to its request transmitted via the RACH, inter alia the information as to which spread code c is used for access and for setting up the connection.

Figure 3:
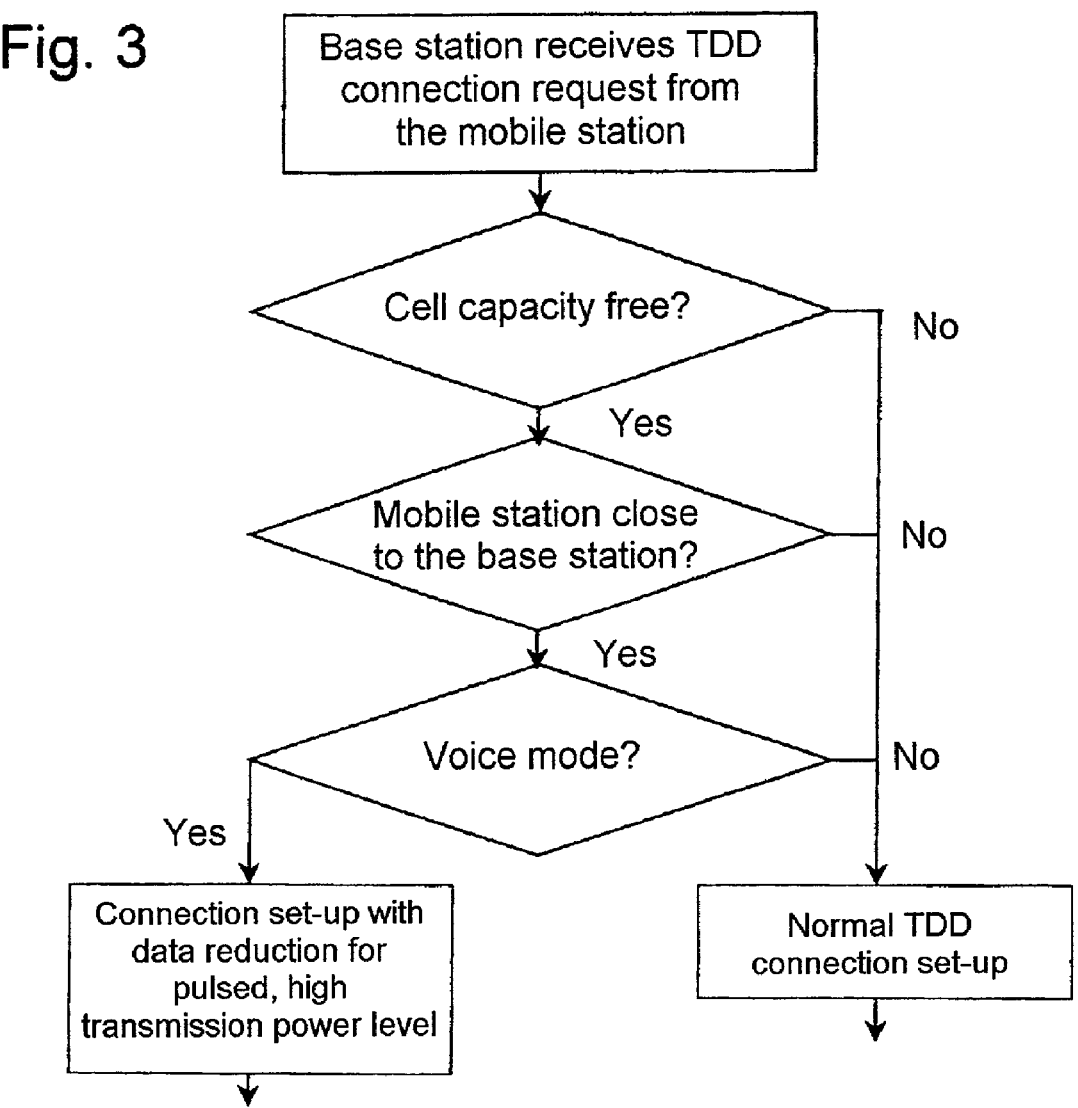
FIG. 3 shows a flowchart of a method for power reduction.

The method shown in FIG. 3 is based on the idea that only some of the received symbols need to be detected and identified correctly when using channel coding for transmission, in order to make it possible to ensure adequate reconstruction of the signal. Wherever channel interleaving is used for transmission as in mobile radio, it is also possible when using redundant codes to correct for groups of errors, such as those which occur with what is referred to as slow frequency hopping in GSM, that is to say, for example, when entire bursts become unusable due to frequency-selective fading or cochannel interference.

In a receiving station, generally the base station BS, once the connection request has been received by another station, especially by a mobile station MS, in the TDD system, the capacity of the associated cell is first determined. If the capacity of that cell is exhausted or is too small, the normal method sequence is started for connection initiation or connection rejection. If the cell has adequate free capacity, depending on the method, it is then determined by way of example, whether the requesting station, in this case the mobile station MS is located in the vicinity of the receiving station BS. If not, the normal connection setting up procedure is initiated. If yes, a check is carried out to determine whether the voice mode has been selected for the requested connection. If no, the normal connection setting up procedure is initiated. If the voice mode has been selected, the station MS requesting that a connection be set up receives a report from the receiving station that it should use the following transmission method with data or power reduction for transmission.

Instead of having to transmit all the coded data at the normal, low transmission power level, a portion of this data is omitted in this transmission method, and the remaining portion of the data is transmitted. When the data reduced in this way is transmitted, the transmission power level is in contrast chosen to be sufficiently high that the transmission is correspondingly freer of errors and the bit error probability is sufficiently low to reconstruct the data. This is because, in general, the bit error probability in the case of symbols transmitted at a sufficiently high power level is lower than for complete data transmission at a low transmission power level. The portion of the data to be omitted is chosen such that data reconstruction can be carried out as reliably as possible.

In the data reduction process, the duration of each omission of data must be shorter, and preferably considerably shorter, than the interleaving depth, and the ratio of omission to the total amount of data should be less (preferably much less), than 1 minus the code rate. When using channel coding, it is generally possible to correct more transmission errors the more error locations are known. At best, the channel decoder can assume deletions for the omitted sections.

The voice mode is particularly suitable for this method since, when voice data is reconstructed, a relatively high residual bit error probability is still acceptable. However, this method can also be used in other modes, with the respectively acceptable residual bit error probability governing the extent of data reduction and the magnitude of the required transmission power level.

The method described above are not all required and can also be interchanged with one another. However, for reduced data transmission, it is necessary to ensure that the transmitted data is transmitted with a bit error probability which is appropriately reduced. To do this, the transmission power level for pulsed operation is preferably defined on the basis of the reduction level in the data.

In other words, this makes use of the situation that, for the same bit error rate BER, power (electrical energy) can be saved when the transmission is pulsed using a high power level, instead of being continuous using a low power level. This is done in conjunction with the utilisation of the channel interleaver, possibly—but not necessarily—with missing data sections being marked as a deletion for the channel decoder, in order to omit data to be transmitted with or without this being known by the receiver.

In a similar way, the mean transmission power level can also be reduced further if the transmitter is already being operated at the lower boundary of its power control range: depending on the code rate, a greater or lesser proportion of the coded data can also be omitted in this case. The application for interference reduction is hence particularly advantageous, when the transmitter itself will receive at the minimum possible transmission amplitude, with a better signal-to-noise ratio than is necessary.

In spread band systems, the spread factor can be reduced for this purpose, with the duty cycle being decreased. Normally, this leads to a lower bit error rate BER than the omission of coded data.

In systems with fast power control, the durations of the active and inactive phases are preferably defined and/or agreed dynamically between the transmitter and receiver. The inactive phases should in this case be shorter than the coherence time of the channel in order to make it possible to obtain up-to-date information about the path loss at sufficiently short time intervals, and to compensate for this path loss. In systems with slow power control, it is likewise advantageous, but not absolutely essential, to define transmission and quiescent phases, or to agree them dynamically. The duration of the inactive phases should be short in comparison to the duration over which the received power level is averaged when calculating the path loss.

When using slow closed-loop power control, the receiver (BS) reports the bit error rate BER or some other suitable measure of the reception quality, to the transmitter (MS). The receiver can thus generally control the transmission power level of the transmitter such that the transmission still works out well even when a portion of the coded data is omitted.

When the reception quality falls owing to the omitted bursts, the receiver generally requests a higher transmission power level. The transmitter needs this capability to be able to transmit at a higher power level in order to allow it to offer sufficiently reliable data transmission. Thus, with power control, the transmitter does not necessarily need to exceed the receiver's requirement in the transmitted bursts in order to keep the bit error rate BER in the required range.

If, when setting up a connection or later, for example after the release of sufficient cell capacities, a change is made from the known complete transmission to the method for omission of transmission data, the change to a lower duty cycle is preferably carried out more slowly than is known by the normal power control, in order that the transmission power level for the transmitted data is readjusted (increased in this direction) without any excessively long delay.

This method is particularly suitable for the TDD system, which is currently the subject of standardization, based on the JD-CDMA principle for UMTS. In this case, the difficulties of fast power control as well as the dependency of the system on the fast power control are avoided. Data may be omitted using various selection methods. For example, in the TDD system, the burst duration can be reduced, that is to say less data is transmitted before and/or after the training sequence, thus shortening the burst (at the front and/or rear).

It is also possible in the TDD system to omit the transmission of entire bursts, for example in the case of a low-rate data channel with interleaving over 80 ms, to transmit fewer bursts, for example only 6, instead of 8 bursts. This variant has the advantage that no training sequence is transmitted either, although the duty cycle can be set only relatively coarsely. Those bursts which are not transmitted may be omitted (pseudo-)randomly or else regularly. The advantage of random omission is the utilization of interference averaging, while the advantage of regular omission is better time diversity.

In the TDD system, the omission method is generally used only when voice-DTX operation is selected or chosen, that is to say when there is no need to transmit any information whatsoever. The power control PC is modified such that the control channel is switched on again shortly before the end of DTX operation. This means that the correct power level is also then set again. This may be done by means of a longer PC stepwidth or combination at the end of the slotted mode. In the downlink, when transmitting from the base station BS to the mobile station MS, the base station BS can also make a decision on the reliability of the power control bit, or PC bit, after evaluation of the PC bit (which is now not present). If this PC bit is not intended to be transmitted, it can keep the power constant rather than control the random value of the PC bit, or possibly reducing the power control once again, which was carried out incorrectly up to that point, even after half the data transmission block or frame.

If the base station BS has no up-to-date information about the reception quality at the mobile station MS due to the burst-like transmission operation of the mobile station MS, and if the information which is available at the base station end (for example good reception quality RxQual with a low reception level RxLev at all the active mobile stations MS and, possibly, corresponding messages from/for adjacent cells) indicates that the capacity is not yet limited by interference, the power level of the transmissions is, if there is any doubt, increased to those mobile stations MS which are temporarily disappearing. In this case, one sensible procedure is not to increase the power level to any greater extent than the amount by which it can be reduced again after receiving new data from the mobile station MS in the same cycle.

If the method is used in the FDD system rather than in the TDD system, alternate slots are preferably transmitted (or a certain number of slots are omitted). Although the power control is then slower, the mobile station MS can combine the power control bit from two (or more) successive bursts (with the same weighting or, for example, with a rising weighting). This results in a lower error rate for the power control bit, which at least partially compensates for the capacity loss once again. Finally, the reduction in the power consumption will be described with reference to a numerical example. In an example of a transmitter, let us assume that the maximum transmission power is minus 14 dB at 20% of its maximum power consumption, and the maximum transmission power is minus 17 dB at 18% of its maximum power consumption. If minus 17 dB were required as the maximum transmission power in order to achieve the required Quality of Service QoS, the transmitter would transmit more efficiently at a maximum transmission power level of minus 14 dB provided the code rate is sufficiently high, as is the case at times, for example, with GSM voice services, and would in this case omit every fourth burst, since its mean power consumption would then fall to ¾ of 20%, that is to say 15% of the maximum value. The saving in this example is 17%.

Figure 4:
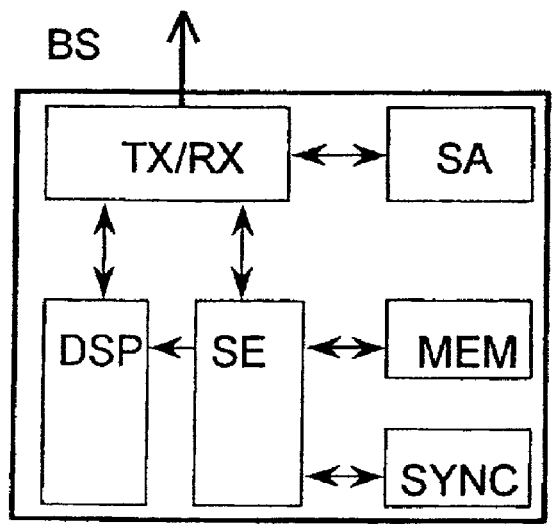
FIG. 4 shows a simplified block diagram of a base station.

FIG. 4 shows how the omission method is carried out in a base station BS. This comprises a transmitting/receiving device TX/RX which converts received signals from the message transmission frequency range to baseband, converts them from analog to digital form, and amplifies and evaluates the received signals. Digital signal processing is carried out in a signal processing device DSP, as the receiving means. Channel estimation is carried out, and the transmitted data symbols are detected.

A signal evaluation device SA extracts the data components from access blocks, and satisfies the requirements for resource allocation. The resource allocation itself is carried out in the device RNM (FIG. 1) for allocation of radio resources, and this is signaled back to the base station BS. A control device SE then assigns a channel for message transmission to the mobile stations MS by composing a corresponding signaling block and transmitting this block by means of the transmitting/receiving device TX/RX. Together with the normal interchanged information, information relating to the initiation of the omission method can also be transmitted to the mobile station MS, and back again.

The interaction of the components and the setting of the transmission time are also controlled by the control device SE. Associated data relating to specific characteristics of the connection are stored in a memory device MEM.

What is claimed is:

1. A method for power reduction during data transmission in a communications system having an interface between at least a first station and a second station, comprising:
    redundantly coding data to be transmitted such that the data is reconstructed in the event of data loss during transmission, the data is transmitted at a first transmission power level, when using a first duty cycle or when using a first spread factor; and
    omitting selected portion of the coded data during transmission, and in the case of a spread band system, the data is transmitted using a spread factor which is less than the first spread factor, wherein
    a duty cycle used for transmission of the data is lower than the first duty cycle, and
    the transmission power level is set to be higher than the first transmission power level, such that a bit error probability reconstructs the transmitted coded data in the first or second station receiving the data.

2. The method as claimed in claim 1, in which the transmission uses the FDD or TDD mode, and data is transmitted in timeslots.

3. The method as claimed in claim 1, wherein
the transmission of the data when the capacity of a battery for the station receiving data is low or exhausted is either initiated at the first transmission power level or a connection request is rejected, and
a transmission mode is initiated with one of the omission of data or the reduction in the duty cycle if the battery has free capacity above a predetermined threshold value.

4. The method as claimed in claim 1, in which information relating to the omitted data is transmitted to a channel decoder in the station receiving the data.

5. The method as claimed in claim 1, in which the omitted data or the duty cycle reduction is identified by a channel decoder as transmission-dependent deletions.

6. The method as claimed in claim 1, in which one of the omitted data or the duty cycle reduction are selected by the stations transmitting and receiving data, or are pre-set.

7. The method as claimed in claim 1, in which transmissions with omitted data or the duty cycle reduction are initiated for stations transmitting data which are located close to the stations receiving data.

8. The method as claimed in claim 1, in which transmissions with omitted data or the duty cycle reduction are initiated in the voice mode.

9. The method as claimed in claim 1, in which the duration of each omission of data is chosen to be shorter than an interleaving depth.

10. The method as claimed in claim 1, in which the ratio of omission to the total amount of data is less than 1 minus a code rate.

11. The method as claimed in claim 1, in which the data is transmitted at an increased power level using a multislot method to reduce interference when the first or second station transmitting with a higher quality signal-to-noise ratio is received.

12. The method as claimed in claim 1, in which the data for the second station which is transmitting at the lowest power level, is transmitted discontinuously.

13. The method as claimed in claim 1, in which the duration of active and inactive phases are defined and/or selected dynamically between the first and second stations.

14. The method as claimed in claim 13, in which the inactive phases are shorter than a coherence time of a control channel.

15. The method as claimed in claim 1 in which transmission and quiescent phases are defined or agreed upon dynamically, with the duration of the inactive phases being short compared to the duration over which the received power is averaged when calculating the path loss.

16. The method as claimed in claim 1, in which, when reception quality reduces after omission of data or the duty cycle reduction, the receiving station requests a higher transmission power level to be higher than the maximum transmission power level in an appropriate transmission standard.

17. The method as claimed in claim 1, wherein the transmission power level of the transmitted data is readjusted without excessive delay.

18. The method as claimed in claim 1, in which burst duration is reduced or not transmitted.

19. The method as claimed in claim 1, in which the power control is modified such that a control channel is switched on before the end of the DTX operation.

20. The method as claimed in claim 1, in which alternate slots are transmitted, or a certain number of slots are omitted.

21. A communication system, comprising:
at least one first station; and at least one second station, connected via an interface for data transmission, wherein at least one of the first and second stations include a processing device for processing, redundantly coded data received or redundantly coded data to be transmitted;
a processing device in at least one of the first and second stations for processing received, redundantly coded data or redundantly coded data to be transmitted, a portion of the data which may be lost during data transmission during at least a first transmission power level, when using a first duty cycle or when using a first spread factor, wherein the processing device
selects and omits a portion of the coded data or uses a spread factor for the transmission of the data,
uses a duty cycle for the transmission of the data which is less than the first duty cycle, and
sets the transmission power level to a higher value than the first transmission power level for the transmission of the data, so that the transmitted data can be reconstructed for an adequate Quality of Service.

\* \* \* \* \*